United States Patent [19]
Renz et al.

[11] 3,965,294
[45] June 22, 1976

[54] METHOD OF AND APPARATUS FOR TESTING TRANSMISSION LINE CARRYING BIPOLAR PCM SIGNALS

[75] Inventors: Günter Renz, Eningen; Walter Wehr, Wannweil; Bertram Amann, Eningen, all of Germany

[73] Assignee: Wandel U. Goltermann, Eningen, Germany

[22] Filed: Apr. 23, 1975

[21] Appl. No.: 570,774

[30] Foreign Application Priority Data
Apr. 23, 1974 Germany............................ 2419478

[52] U.S. Cl............................. 178/69 A; 325/38 A
[51] Int. Cl.²........................................ H04L 25/06
[58] Field of Search............. 178/23 A, 69 A, 69 R, 178/69.5 R, 68; 325/38 A, 42; 340/347 DD; 328/162, 163, 164

[56] References Cited
UNITED STATES PATENTS

| | | | |
|---|---|---|---|
| 3,718,813 | 2/1973 | Williams, Jr. et al............. | 178/69 A |
| 3,761,818 | 9/1973 | Tazaki et al...................... | 325/38 A |
| 3,828,346 | 8/1974 | Forster et al.................... | 340/347 DD |
| 3,838,214 | 9/1974 | Lind................................ | 325/38 A |

Primary Examiner—Thomas A. Robinson
Attorney, Agent, or Firm—Karl F. Ross; Herbert Dubno

[57] ABSTRACT

To check the bit-distortion ratio of a transmission line carrying bipolar PCM signals, converted from a binary to a balanced ternary code at the tramsmitting end and reconverted into binary signals at the receiving end, binary test words and identical reference words are simultaneously read out from storage at opposite ends of the line. The test words are converted into bipolar form, for transmission, and the received pulses are distributed according to polarity over a first pair of leads while the binary pulses of the reference words are distributed over a second pair of leads according to the conversion code used at the transmitting end. The pulse trains on corresponding leads are compared, bit by bit, in a deviation monitor whose output, in response to any mismatch, advances a reversible counter which is reverse-stepped by timing pulses of a cadence reduced by a frequency divider to a fraction of the bit rate. If the error rate exceeds that fraction of the bit rate, the counter reaches an alarm position in which it emits an enabling signal allowing a polarity comparator to switch the local pulse distributors while letting a polarity-independent pattern comparator arrest the readout of reference words until the patterns of energization of the two pairs of leads are again identical.

10 Claims, 3 Drawing Figures

METHOD OF AND APPARATUS FOR TESTING TRANSMISSION LINE CARRYING BIPOLAR PCM SIGNALS

FIELD OF THE INVENTION

Our present invention relates to a method of checking the bit-distortion ratio of a PCM transmission line of the bipolar type, operating with a balanced ternary code, and to an apparatus for carrying out this method.

BACKGROUND OF THE INVENTION

In PCM communication systems in which a line is energized with unipolar voltage to transmit messages in a binary code, the distortion coefficient of the line in terms of a ratio of incorrectly and correctly transmitted bits can be determined by generating a succession of binary test words at the transmitting end along with matching reference words at the receiving end and by comparing the incoming test words, bit by bit, with the locally generated reference words. In such a system, the two code-word generators at opposite ends of the line are synchronized with the aid of timing signals extracted from the incoming test words at the receiving end; if a succession of error indications shows that the two generators have fallen out of step, synchronism can be restored by delaying the locally generated reference sequence until the errors disappear.

Recent developments have led to the adoption of bipolar coding designed to minimize the electrical unbalancing of a line, i.e. to suppress the d-c component present in a unipolar signal. Thus, a balanced ternary code known as "AMI" (for "Alternate Mark Inversion") converts the "marks", i.e. the bits of logical value 1, in a binary code word into alternating positive and negative pulses while the intervening "spaces" (i.e. bits of logical value 0) are represented by zero voltage. A more sophisticated code known as "$HDB_n$" (for "High-Density Bipolar") introduces a so-called violation, i.e. a pulse of the same polarity as an immediately preceding marking pulse, into the bit stream after every $n^{th}$ space in an unbroken succession of zeros of the original binary message, with relative polarity inversion between consecutive violation pulses; thus, the designation $HDB_3$ denotes a balanced ternary code in which the line is never de-energized for more than three pulse cycles or bit periods in a row. To preserve the basic balance as well as the distinction between marking and violation pulses, such a code also calls for the retroactive introduction of an additional bit, namely a pulse with the same polarity as the following violation pulse, at the beginning of any four-zero series immediately preceded by a marking pulse whose polarity matches that of the previous violation pulse.

Upon the reconversion of such a ternary code into the corresponding binary pulse sequence at the receiving end, a comparison between the incoming test words and the local reference words no longer insures proper interpretation of an error signal, or of a succession of such signals, as the result of faulty synchronization. Thus, if the errors are due to improper reconversion, the malfunction cannot be remedied by delaying the reference sequence.

OBJECTS OF THE INVENTION

An object of the present invention, therefore, is to provide a method of and means for facilitating the testing of the distortion ratio of a communication channel, specifically a transmission line or series of such lines with interposed pulse regenerators, operating with a bipolar code of the general character described above.

A more particular object is to provide testing means in such a system adapted to be used with different types of balanced ternary codes, such as the AMI and $HDB_n$ codes referred to.

SUMMARY OF THE INVENTION

We realize these objects, in accordance with our present invention, by converting the incoming bipolar test words at the receiving end of the line into a first pair of binary pulse trains, according to the polarities of the respective bits, and splitting the locally generated sequence of reference words in an analogous manner into a second pair of binary pulse trains simulating bits of one or the other polarity in conformity with the conversion code used at the transmitting end of the line. Corresponding pulse trains of each pair are compared, bit by bit, and a contrast in polarity is used to modify the pulse distribution of the locally generated sequence in a simulated polarity reversal. A polarity-independent pattern comparison determines the need for resynchronization.

According to a more particular feature of our invention, the error signals controlling polarity reversal and resynchronization become effective only if the error rate exceeds a certain fraction of the bit rate. For this purpose we provide, in an apparatus embodying our invention, a reversible pulse counter stepped forward by error signals indicative of any mismatch and backward by timing pulses of a cadence stepped down from the bit frequency. These timing pulses may be derived from a sync-pulse extractor through a frequency divider whose step-down ratio determines the permissible bit-distortion ratio.

BRIEF DESCRIPTION OF THE DRAWING

The above and other features of our invention will now be described in detail with reference to the accompanying drawing in which.

SPECIFIC DESCRIPTION

Figure 1:
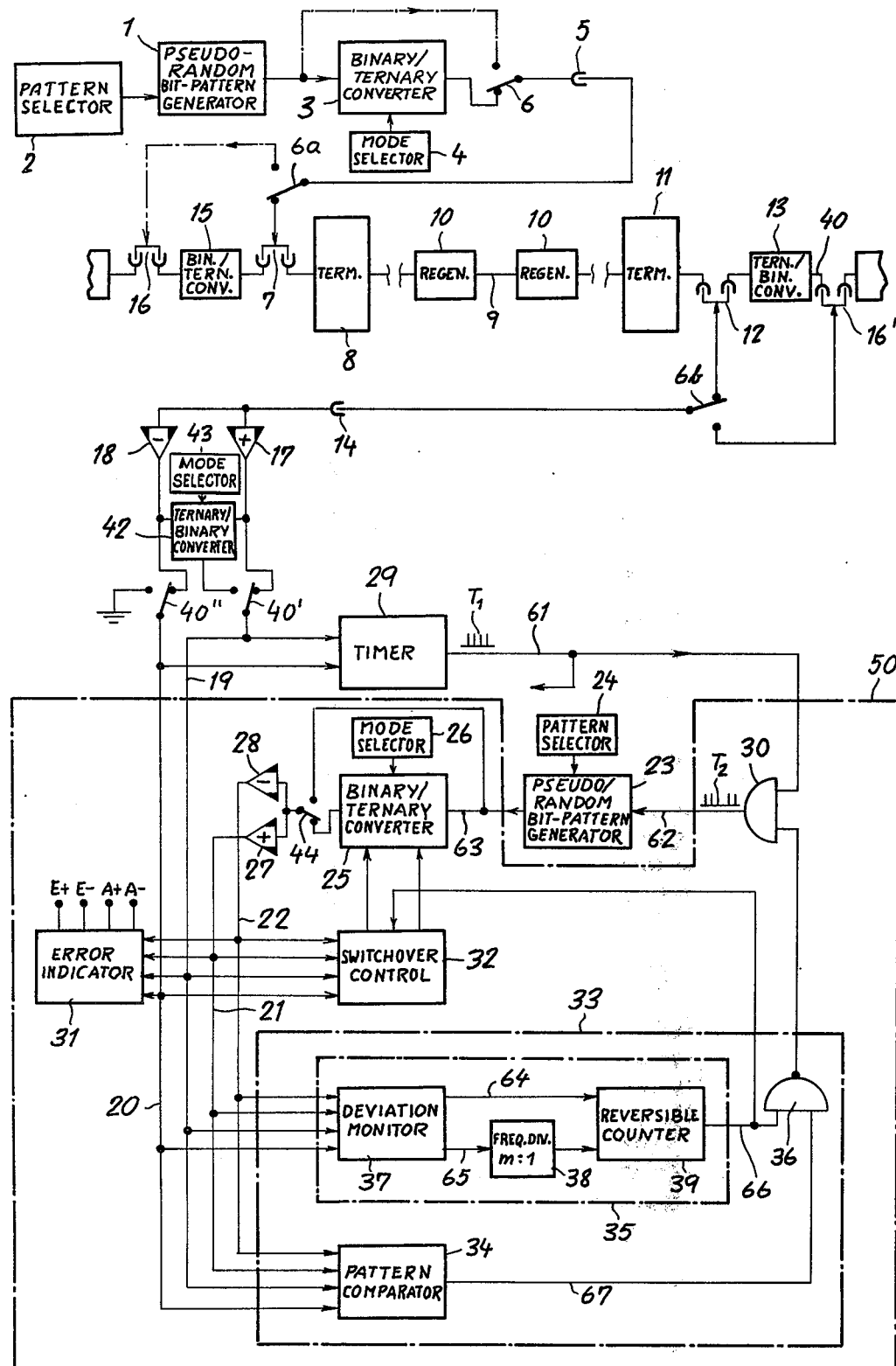
FIG. 1 is a block diagram of a PCM telecommunication system provided with line-testing equipment according to our invention.

In FIG. 1 we have shown a bit-pattern generator 1 of the pseudo-random type, e.g. a shift register with a code-modifying feedback connection, from which a certain binary code word may be periodically read out under the control of an associated pattern selector 2. This generator works into a binary/ternary converter 3, controlled by a mode selector 4, which changes the unipolar bit stream into a bipolar one; the converter may be selectively operable, for example, according to the aforementioned AMI and $HDB_n$ codes as more particularly discussed hereinafter.

Through a switch 6 and a coupler 5, the output signals of converter 3 are fed to a junction 7 between a similar converter 15 and a transmitting terminal 8 of a communication channel 9 consisting of several line segments interconnected by signal regenerators 10. In the normal operation of the line 9, converter 15 receives binary messages via a junction 16 from a source not further illustrated and translates them into a balanced ternary code of the AMI or $HDB_n$ type. If this converter is known to be free from operational defects, it can be substituted for converter 3 during testing by reversing the switch 6 and a similar switch 6a to feed the code words of pattern generator 1 directly to junction 16.

At the remote end of line 9, a receiving terminal 11 is connected via a junction 12 to a ternary/binary converter 13 serving to decode the incoming bipolar signals so as to replicate the original binary messages for retransmission to a nonillustrated load by way of a junction 16'.

With the aid of another switch 6b, either the ternary bit stream from junction 12 or its binary equivalent from junction 16' can be fed via a coupler 14 to a line-testing apparatus 50. From coupler 14 the incoming pulses are delivered in parallel to a pair of limiting amplifiers 17, 18 respectively responding to positive and negative bits which, in the illustrated position of a pair of switches 40', 40'', are transmitted to a pair of leads 19, 29 in the form of respective unipolar pulse trains of preferably the same polarity. Another ternary/binary converter 42, controlled by a mode selector 43, substantially duplicates the converter 13 and can be used, in an essentially conventional manner, for the checking of synchronism without regard to the law of formation of the ternary code; for this purpose the switches 40' and 40'' are reversed, with lead 20 permanently grounded. A similar result is obtained by a reversal of switch 6b with switches 40' and 40'' in their illustrated position.

A timer 29 is connected across leads 19 and 20 to extract therefrom a succession of clock pulses $T_1$ in a manner well known per se, these pulses appearing on a lead 61 with branches extending to various components of line tester 50 as described hereinafter with reference to FIG. 3. The pulses $T_1$ normally pass through an AND gate 30 in apparatus 50, an output lead 62 of gate 30 being connected to a pseudo-random bit-pattern generator 23 which essentially duplicates the generator 1 at the transmitting end and is controlled by a pattern selector 24. A selected code word, corresponding to that delivered by generator 1, is thus periodically read out from generator 23 at the same bit rate. Clock pulses $T_1$ normally give rise to synchronizing pulses $T_2$ in the output of AND gate 30.

The local pattern generator 23 works through a lead 63 into a binary/ternary converter 25 which is provided with a mode selector 26 and is a counterpart of converters 3 and 15. Via a switch 44 and two limiting amplifiers 27 and 28 in parallel, converter 25 energizes another pair of leads 21, 22 with two interleaved unipolar pulse trains normally identical with the pulse trains appearing on leads 19 and 20 respectively. If only a unipolar bit stream is to be checked, i.e. with switch 6b or switches 40', 40'' reversed, switch 44 will also be placed in its alternate position to close a bypass around converter 25, thereby idling the amplifier 28 and directing the locally generated bit pattern exclusively to lead 21; this alternate mode of operation, described only for the sake of completeness, is not encompassed within the scope of our present invention.

The two conductor pairs 19 – 22 have parallel branches connected to four comparison circuits consisting essentially of logical coincidence or anticoincidence gates, i.e. an error indicator 31, a switchover-control circuit 32 associated with converter 25, a pattern comparator 34 and a deviation monitor 37. Indicator 31 emits visual signals in response to a mismatch between the incoming pulse trains on leads 19, 20 and the locally generated pulse trains on leads 21, 22. Signals E+ and E− reveal the acquisition of a positive or a negative pulse during transmission over line 9; signals A+ and A− call attention to the loss of a positive or a negative pulse.

Control circuit 32 responds to the coincidence of incoming and local pulses signifying bits of opposite polarities; in the event of such a polarity mismatch, circuit 32 reverses the operation of converter 25 so as to transpose the pulse trains on leads 21 and 22.

Pattern comparator 34 carries out a polarity-independent check to determine whether an incoming pulse on either of leads 19, 20 coincides with a locally generated pulse on either of leads 21, 22.

Deviation monitor 37, forming part of a synchronization-control circuit 35, detects any disparity between the pulse trains on leads 19 and 20, on the one hand, and those on leads 21 and 22, on the other hand. Any mismatch gives rise to an error pulse on an output lead 64 which terminates at a forward-stepping input of a reversible pulse counter 39. Another lead 65 receives an "OK" pulse in any clock cycle in which there is no error pulse, the cadence of these OK pulses being stepped down by a frequency divider 38 to a fraction of the bit rate; with a step-down ratio of $m:1$ every mth OK pulse reaches a backward-stepping input of counter 39. If the error rate exceeds the $(m+1)$th part of the bit rate, counter 39 will eventually become fully loaded to energize a lead 66 extending on the one hand to a NAND gate 36 working into AND gate 30 and on the other hand to an enabling input of switchover-control circuit 32. The capacity of counter 39 (e.g. 248 pulses) is so chosen that the alarm position can be reached only in the presence of persistent errors indicative of lack of synchronization. It is only in that instance that a disparity signal from pattern comparator 34, generated on an output lead 67 terminating at NAND gate 36, cuts off that gate and with it the AND gate 30 through which the timing pulses $T_2$ are fed to pattern generator 23. In the absence of the enabling signal on lead 66, control circuit 32 is likewise inhibited whereby isolated occurrences of a polarity mismatch are ineffectual.

The local converter 25 need not actually produce pulses of opposite polarities in a single bit stream to be separated in a distributing circuit 27, 28, as indicated schematically in FIG. 1. Thus, as described below with reference to FIG. 3, it suffices if this converter directly energizes the leads 21 and 22 with interleaved pulse trains simulating respective polarities.

Figure 2:
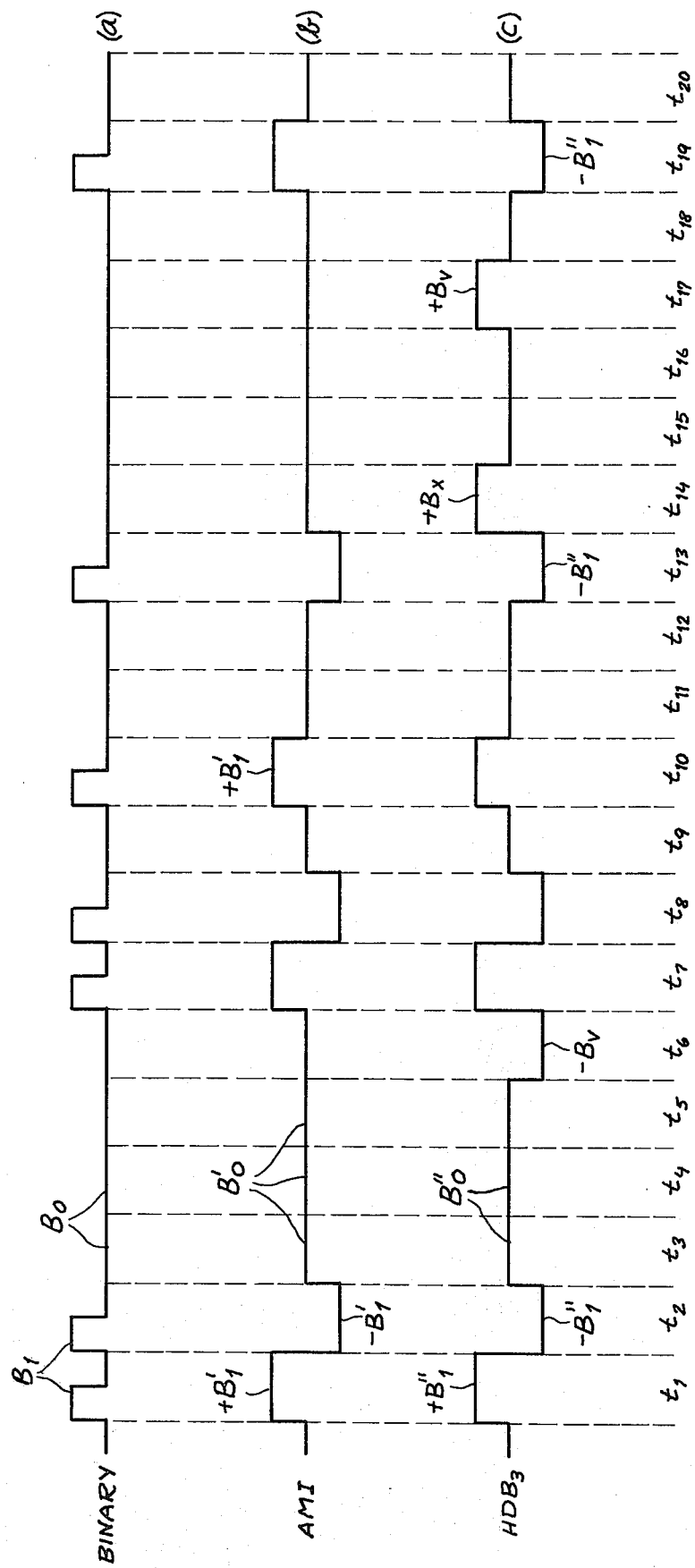
FIG. 2 is a set of graphs illustrating the relationship between binary and balanced ternary bit streams.

In FIG. 2 we have shown at (a) a binary bit sequence consisting of unity bits or marks $B_1$ and zero bits or spaces $B_0$. Bits $B_1$ are represented by positive line voltage whereas bits $B_0$ are characterized by the absence of voltage. Thus, there exists an unbalanced pulse sequence with a definite d-c component.

Graph (b) of FIG. 2 represents the corresponding bipolar pulse sequence according to the AMI code, illustrated for 20 consecutive clock cycles $t_1 - t_{20}$. In this code, successive marks such as those in clock cycles $t_1$, $t_2$, $t_7$, $t_8$, $t_{10}$ etc. are alternately represented by positive bits $+B'_1$ and negative bits $-B'_1$; as in the binary code of graph (a), spaces are invariably denoted by the absence of voltage, as indicated at $B'_0$, whereby the line may remain de-energized for prolonged periods which creates some problems of synchronization.

Graph (c) illustrates the more elaborate $HDB_3$ code, the subscript 3 signifying that the line does not remain de-energized for more than three clock cycles. Thus, the four consecutive zeros appearing in clock cycles $t_3 - t_6$, following a pair of marks represented by pulses $+B''_1$ and $-B''_1$ of opposite polarities, result in zero voltage $B''_0$ for the first three cycles and a violation bit $-B_v$ in the fourth cycle $t_6$, the polarity of this violation bit being the same as that of the immediately preceding marking pulse $-B''_1$ (here negative) in order to indicate that this is not a new mark. According to this code, successive violation bits are to be of alternate polarity. Thus, in a series of five consecutive zeros in cycles $t_{14} - t_{18}$, a positive violation bit $+B_v$ appears in the fourth cycle $t_{17}$; this violation bit, however, is now also of opposite polarity compared with the immediately preceding marking bit $-B''_1$ in cycle $t_{13}$, it being therefore necessary to introduce a supplemental bit $+B_x$ in the cycle $t_{14}$ containing the first zero. Pulse $+B_x$ is recognized as a supplemental bit, rather than a marking bit, from the fact that it is followed by a violation bit $+B_v$ of the same polarity (here positive) with only two zero-voltage cycles in between. Thus, proper decoding must take into account the past history of the pulse sequence and requires the storage of $(n + 1)$ immediately consecutive bits.

Figure 3:
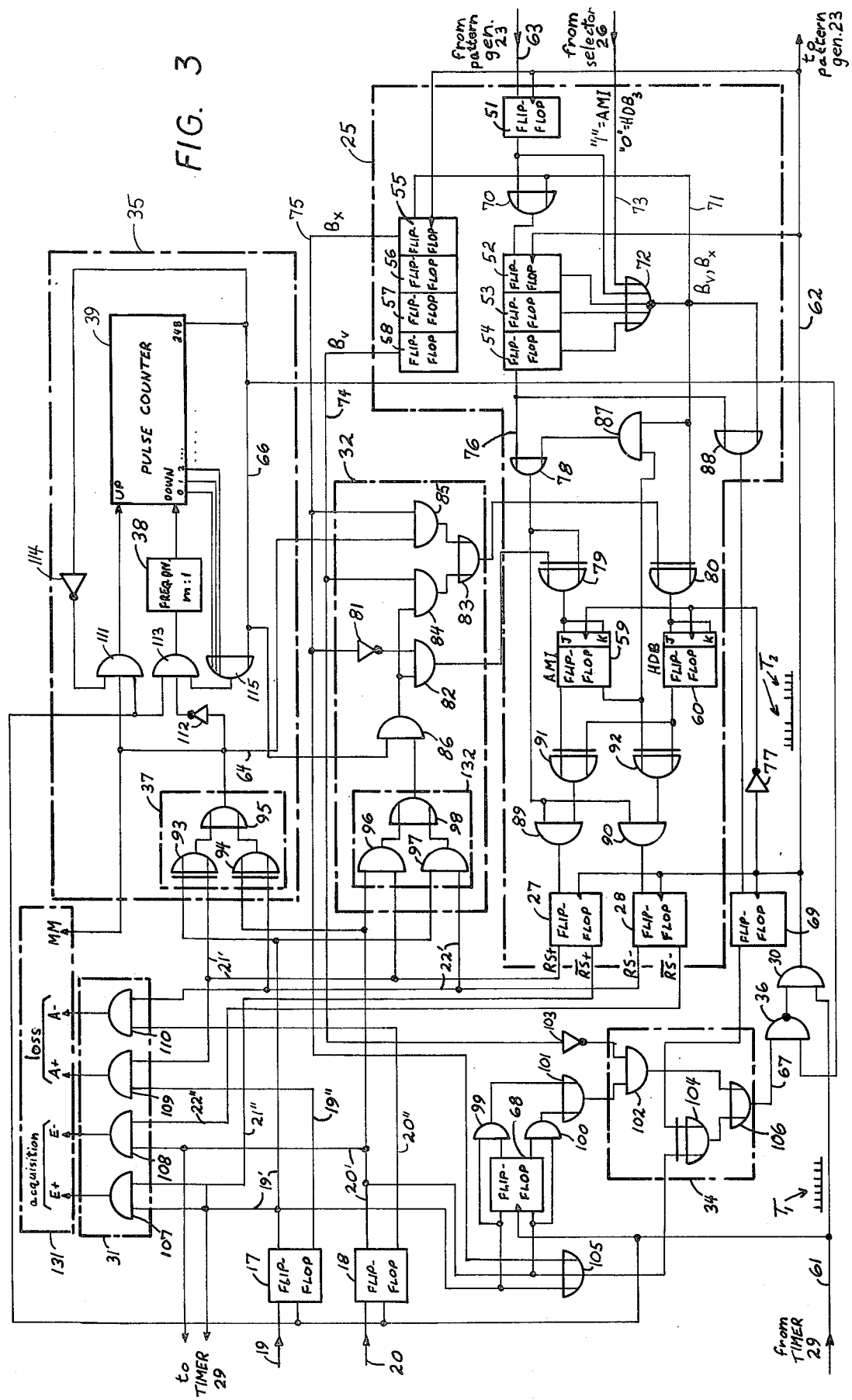
FIG. 3 is a more detailed circuit diagram of the line-testing equipment shown in FIG. 1.

In FIG. 3 we have shown the code converter 25 as comprising two 4-stage shift registers, i.e. two groups of cascaded flip-flops 51 – 54 and 55 – 58 of the data type which are triggered by the leading edges of timing pulses $t_2$ from lead 62 applied to their respective control inputs (the control inputs of stages 53, 54 and 56 – 58 not having been illustrated). Stages 51 and 52 of the first shift register are separated by an OR gate 70 with a first input connected to an output of stage 51 and with a second input tied to a lead 71 which originates at a NOR gate 72 and also extends to the data input of stage 55 of the second shift register. NOR gate 72 receives the stage outputs of all four flip-flops 51 – 54 of the first register as well as a discriminating bit on an output lead 73 of mode selector 26 (FIG. 1); a discriminating bit of logical value 1 signifies an AMI code whereas a value 0 thereof indicates the HDB code. With lead 73 energized, NOR gate 72 has a permanent zero output on lead 71 so that shift register 55 – 58 does not operate. If selector 26 is set for the $HDB_3$ code and de-energizes the lead 73, shift register 55 – 58 receives a pulse whenever there are four consecutive zeros in stages 51 – 54. A pulse on lead 71 loads the flip-flop 52 via OR gate 70 and enters a violation bit $B_v$ in stage 55; after three more timing pulses $T_2$ on lead 62, the presence of this violation bit gives rise to the energization of an output lead 74 of stage 58. A possible supplemental bit $B_x$ is indicated by the energization of an output lead 75 of stage 55, coinciding with the appearance of the first of three consecutive zeros on an output lead 76 of stage 54.

Two flip-flops 59 and 60 of the J-K type, constituting a switching stage, are triggerable via an inverter 77 on the trailing edges of timing pulses $T_2$; flip-flop 60 intervenes only in the case of an HDB code. These flip-flops are controlled by respective XOR (Exclusive-OR) gates 79 and 80, gate 79 having an input connected to lead 76 via an OR gate 78 and another input connected by way of an inverter 81 and an AND gate 82 to lead 75. Gate 80 has an input tied to lead 71 and another input connected via an OR gate 83 to the outputs of two AND gates 84, 85 with input connections to leads 74 and 75, respectively. Gates 82–86 form part of switchover-control circuit 32, together with a polarity comparator 132.

In the AMI mode, with leads 71, 74 and 75 permanently de-energized, XOR gate 80 has no input so that flip-flop 60 is deactivated. In the $HDB_3$ mode, XOR gate 80 acts as an inverter for the output voltage of OR gate; a further AND gate 86 in circuit 32 conducts in the presence of a disparity signal from comparator 132 together with an enabling signal on the output lead 66 of pulse counter 39. Upon thus conducting, gate 86 unblocks the gates 82 and 84 for the passage of an inverted supplemental-bit signal on lead 75 and a violation-bit signal on lead 74, respectively; AND gate 85 conducts upon the simultaneous presence of an error signal on the output lead 64 of deviation monitor 37 and a pulse on lead 75.

A second input of OR gate 78 is tied to the output of an AND gate 87 connected on the one hand to lead 71 and on the other hand to a reset output of flip-flop 59. Another OR gate 88, with inputs connected to leads 71 and 76, works into a data input of a flip-flop 69 also controlled by timing pulses $T_2$ on the output lead 62 of AND gate 30. The same timing pulses feed control inputs of two further flip-flops 27 and 28 representing the correspondingly designated limiting amplifiers of FIG. 1. The data inputs of these latter flip-flops are energizable by the outputs of two AND gates 89, 90 having inputs connected in parallel to the output of OR gate 78 and other inputs respectively energizable by two XOR gates 91, 92 each with an input connected to a set output of HDB flip-flop 60 and another input respectively connected to a set and a reset output of AMI flip-flop 69.

Monitoring network 37 comprises two XOR gates 93, 94 working into a common OR gate 95. In a somewhat similar manner, network 132 includes a pair of AND gates 96, 97 working into a common OR gate 98. A further flip-flop 68, triggerable by clock pulses $T_1$ on lead 61, feeds the pattern comparator 34 through a pair of AND gates 99, 100 in cascade with an OR gate 101, each of these AND gates being connected to a respective data input and a respective output of flip-flop 68 so that one of them conducts if two pulses successively appear on the corresponding data input during consecutive clock cycles. Comparator 34 includes an AND gate 102, with inputs connected to OR gate 101 and through an inverter 103 to lead 74, an XOR gate 104 with inputs energizable by flip-flop 69 and by an OR gate 105, and an OR gate 106 inserted between gates 102, 104 and lead 67.

Limiting amplifiers 17 and 18 of FIG. 1 have also been shown as a pair of flip-flops which are triggerable by clock pulses $T_1$ and have data inputs tied to leads 19 and 20 to receive test pulses MS+ and MS− representative of positive and negative bits in the incoming message. These test pulses are transmitted by the flip-flops 17 and 18 to extensions 19′ and 20′ of leads 19 and 20 and also, as negations $\overline{MS+}$ and $\overline{MS-}$, to companion leads 19″ and 20″. In an analogous manner, flip-flops 27 and 28 have output leads 21′, 21″ and 22′, 22″ carrying respective reference pulses RS+ and RS−, representative of locally generated bits of simulated positive and negative polarities, as well as their negations $\overline{RS+}$ and $\overline{RS-}$. Naturally, the four-bit delay in shift register 51–55 is taken into account in determining the correlation between test and reference pulses.

XOR gates 93 and 94 are connected across leads 19', 21' and 20', 22', respectively, thus having an output only if there is a disparity in the signals present on these leads. AND gates 96 and 97 are respectively connected across leads 20', 21' and 19', 22', being energized only if these nonrelated leads carry pulses at the same time. OR gate 105 has inputs connected to leads 19', 20' and 75; the first two of these leads also feed the flip-flop 68.

Error indicator 31 comprises four NAND gates 107, 108, 109, 110 respectively generating the acquisition and loss signals E+, E− and A+, A−. Gates 107 – 110 are connected across respective lead combinations 19'/21'', 20'/22'', 19''/21' and 20''/22'. A display unit 131 of indicator 31 visualizes these error signals as well as a signal MM, representing any kind of mismatch, appearing on the output lead 64 of deviation monitor 37. The same signal MM is delivered directly to an AND gate 111 and via an inverter 112 to an AND gate 113 of sync-control circuit 35, these AND gates also receiving the clock pulses $T_1$ from lead 61; gate 111 is connected to the output lead 66 of counter 39 by way of an inverter 114 whereas gate 113 has a third input energizable by an OR gate 115 with input connections to all the stages of the counter. Gate 111 feeds the forward-stepping input UP of counter 39 whereas gate 113 works via frequency divider 38 into the backward-stepping input DOWN thereof. The reverse stepping of the counter is inhibited by the blocking of gate 113 when the counter is cleared; similarly, forward stepping is possible only as long as lead 66 is not energized.

In the normal course of a testing operation, if the system operates in the AMI mode, bits arriving on lead 63 from pattern generator 23 (FIG. 1) at flip-flop 51 are transmitted through the shift register 51 – 54 in the rhythm of the timing pulses $T_2$, any marking bit $B_1$ — see FIG. 2(a) — read out from the pattern generator appearing after four clock cycles on lead 76 and passing through OR gate 88 so that flip-flop 69 delivers a pulse to XOR gate 104. With lead 75 de-energized in this mode of operation, gate 104 remains nonconducting as long as a pulse of either polarity arrives simultaneously over the line to energize one of leads 19' and 20'. If AND gate 82 has no output, XOR gate 79 conducts in cascade with OR gate 78 and causes a reversal of flip-flop 59 at the end of the corresponding timing pulse $T_2$; this results in the alternate conduction of AND gates 89 and 90 with alternate energization of leads 21' and 22'. If the patterns of energization of leads 19' and 20' differ from those of leads 21' and 22', either or both of the two XOR gates 93, 94 in deviation monitor 37 conduct and cause the energization of lead 64 with consequent unblocking of AND gate 111 and blocking of AND gate 113 through which clock pulses $T_1$ pass to respective inputs of counter 39. The counter is thus advanced one step by the error signal issuing from logic network 37. If this advance does not load the counter to the limit of its capacity, lead 66 remains de-energized and a succession of $m$ clock pulses $T_1$ with no intervening error signal restores the previous count. If, however, the alarm condition is reached, voltage on lead 66 unblocks the AND gate 86 in the output of polarity comparator 132 so that AND gate 82 conducts if a test pulse MS+ or MS− respectively coincides with a reference pulse RS− or RS+ symbolizing the opposite polarity. In that event the AND gate 82 energizes one of the inputs of XOR gate 79 which thereupon inverts the signal fed to its other input from OR gate 78, thus preventing the switchover between flip-flops 27 and 28 in that cycle. This interruption of the series of reversals restores the correlation between the patterns on lead pairs 19', 20' and 21', 22'.

If the error signal emitted by network 37 is due to loss of synchronization rather than to a polarity inversion, comparator 132 has no output; in that instance, however, the presence of a pulse on lead 76 coincides with zero voltage on leads 19' and 20' so that OR gate 105 is cut off and XOR gate 104 conducts, thereby blocking the NAND gate 36 and with it the AND gate 30 in cascade therewith. This action results in the stopping of timing pulses $T_2$ on lead 62 so that pattern generator 23 is arrested and flip-flops 51 – 54, 27, 28 and 69 are no longer triggered until a pulse does appear on lead 19' or 20'. With synchronization thus re-established, normal operation proceeds.

If the system is set for the HDB$_3$ mode, the operation is the same as that described above as long as not more than three stages of shift register 51 – 54 have simultaneous zero outputs. With four consecutive zeros, however, the energization of lead 71 results in the setting of flip-flops 52, 55 and 69 as well as in the application of voltage to one input of each of gates 80 and 87. Register stage 52 thereby receives a pulse which, on the next timing cycle, supersedes the fourth zero coming from stage 51 so as to play the part of a violation bit $B_v$ upon subsequently emerging from stage 54. The corresponding bit in stage 55 of the other shift register leaves the last stage 58 thereof one cycle later, thus at the same time that the existence of a violation bit in the incoming test pattern is revealed by AND gate 99 or 100 in normal operation. Owing to the presence of inverter 103, AND gate 102 of pattern comparator 34 conducts only if neither of gates 99 and 100 has an output during energization of lead 74. The simultaneous energization of leads 71 and 75, with setting of flip-flop 69, applies voltage to both inputs of XOR gate 104 to prevent the comparator 34 from responding to the absence of pulses on leads 19' and 20' inasmuch as any disparity at this point may be due to a polarity error rather than to lack of synchronism. If flip-flop 59 happens to be reset, AND gate 87 passes the pulse on lead 71 through OR gate 78 to gates 79, 91 and 92 as a supplemental bit $B_x$. The effect of the resulting reversal of AMI flip-flop 59, on the trailing edge of the timing pulse $T_1$ whose leading edge initiated the energization of lead 71, is canceled by the concurrent reversal of HDB flip-flop 60 so that the following violation bit, when appearing on lead 76, passes the same AND gate 89 or 90 that gave passage to the supplemental bit $B_x$, depending on the prior position of flip-flop 60. If the violation bit is followed by an odd number of marking bits before the next four-zero sequence occurs, the succeeding energization of lead 71 finds the flip-flop 59 in its set condition so that AND gate 87 does not conduct and no supplemental bit $B_x$ is generated; the voltage on lead 71 then simply reverses the flip-flop 60 once more, thereby insuring that the violation bit later issuing from stage 54 reaches the same flip-flop 27, 28 that responded to the last marking bit. If, however, the number of intervening marking pulses is even (including zero), the reset state of flip-flop 59 will cause a recurrence of the steps previously described, with interpolation of another supplemental bit; thus, the system operates in conformity with the HDB$_3$ code discussed in conjunction with FIG. 2(c).

During the cycles reserved for the possible generation of a supplemental bit $B_r$, identified by the energization of lead 75, an output signal of polarity comparator 132 passed by gate 86 — in the presence of an enabling signal from pulse counter 39 — cannot reach the XOR gate 79 since AND gate 82 is blocked via inverter 81. An error signal from network 37, however, then passes through gates 85, 83 and 80 to trip the flip-flop 60 for a simulated polarity reversal; this is the only corrective operation not dependent upon energization of lead 66. Flip-flop 60 is also reversed, via AND gate 84, if AND gate 86 conducts with lead 74 energized, thereby canceling the effect of a simultaneous reversal of flip-flop 59 by way of gates 82 and 79 in the cycle immediately following the read-out of a violation bit on lead 76 during which the network 34 checks the existence of such a violation bit in the test pattern as described above.

We claim:

1. A method of checking the bit-distortion ratio of a transmission line carrying the bipolar equivalent of binary message signals consisting of marks and spaces transmitted at a constant bit rate, comprising the steps of:

generating, at a transmitting end of said line, a binary test pattern;

converting said binary test pattern into an equivalent ternary test pattern with translation of successive marks of the binary pattern into bipolar pulses of alternating polarity;

transmitting said ternary test pattern over the line;

generating, at a receiving end of said line, a binary reference pattern matching said test pattern;

separating, at said receiving end, the bipolar pulses of the incoming ternary pattern according to their polarity and deriving therefrom a first pair of binary pulse trains;

deriving from the marks of said reference pattern a local pulse sequence in step with the incoming bipolar pulses;

dividing said local pulse sequence into a second pair of binary pulse trains respectively duplicating related pulse trains of said first pair, upon accurate transmission of said ternary test pattern, according to the law of conversion used at the transmitting end; and comparing corresponding pulse trains of said first and second pairs, bit by bit, to discover any disparity therebetween.

2. A method as defined in claim 1 wherein the comparison of said pulse trains includes a polarity check, with emission of one type of error signal upon detection of a coincidence between a pulse of a pulse train of said first pair and a pulse of an unrelated pulse train of said second pair, and a pattern check, with emission of another type of error signal upon detection of lack of coincidence between a pulse of either pulse train of said first pair and a pulse of either pulse train of said second pair.

3. A method as defined in claim 2, comprising the further steps of simulating a polarity reversal by modifying the distribution of pulses from said local pulse sequence to said second pair of pulse trains in response to said one type of error signal and resynchronizing said test patterns by suspending the generation of said reference pattern in response to said other type of error signal.

4. A method as defined in claim 3, comprising the further step of comparing the occurrence rate of error signals of either type with a predetermined fraction of the bit rate and preventing said error signals from modifying said distribution of pulses and from suspending the generation of said reference pattern unless said occurrence rate exceeds said fraction of the bit rate.

5. An apparatus for checking the bit-distortion ratio of a transmission line carrying the bipolar equivalent of binary message signals consisting of marks and spaces transmitted at a constant bit rate, comprising:

first pattern-generating means at a transmitting end of a line to be tested for producing a binary test pattern composed of marks and spaces;

second pattern-generating means at a receiving end of said line for producing a binary reference pattern identical with said test pattern;

first conversion means at said transmitting end for changing said binary test pattern into an equivalent ternary test pattern with translation of successive marks of the binary pattern into bipolar pulses of alternating polarity, said first conversion means being connected to the line for transmitting said ternary test pattern thereover;

second conversion means connected to the line at said receiving end for separating the bipolar pulses of the incoming ternary pattern according to their polarity and deriving therefrom a pair of binary pulse trains on a first and a second signal path;

distributing means connected to said second pattern-generating means for deriving from the marks of said reference pattern a local pulse sequence and directing the pulses thereof onto a third and a fourth signal path as another pair of binary pulse trains respectively duplicating the pulse trains on said first and second signal paths according to the mode of operation of said first conversion means;

timing means connected to said line and to said second pattern-generating means for synchronizing same with said first pattern-generating means and maintaining said local pulse sequence in step with the incoming bipolar pulses; and comparison means connected to said signal paths for detecting a disparity between said pairs of pulse trains and emitting an error signal in response to any such mismatch.

6. An apparatus as defined in claim 5 wherein said comparison means includes a polarity comparator, emitting one type of error signal in response to pulse coincidences on said first and fourth paths and on said second and third paths, and a pattern comparator, emitting another type of error signal in response to lack of coincidence of a pulse on either of said first and second paths with a pulse on either of said third and fourth paths.

7. An apparatus as defined in claim 6 wherein said polarity comparator has output means connected to said distributing means for reversing the connection thereof to said third and fourth paths in the presence of said one type of error signal to simulate a polarity reversal, said pattern comparator having output means connected to said second pattern-generating means for suspending the generation of said reference pattern in the presence of said other type of error signal to resynchronize said test and reference patterns.

8. An apparatus as defined in claim 7 wherein said comparison means further includes a deviation monitor for detecting any mismatch between said binary pulse trains and emitting a further type of error signal in response thereto, and counting means connected to said deviation monitor for determining the recurrence rate of said further type of error signal, said comparators being provided with blocking means connected to said counting means for inhibiting the reversal of the connection of said distributing means and the suspension of the generation of said reference pattern upon said recurrence rate falling below a predetermined limit.

9. An apparatus as defined in claim 8 wherein said counting means comprises a reversible pulse counter with a forward-stepping input connected to said deviation monitor and a backward-stepping input connected to said timing means, the connection between said timing means and said backward-stepping input including a frequency divider.

10. An apparatus as defined in claim 7 wherein said distributing means includes storage means for bits of said local pulse sequence and switchover means jointly controlled by the contents of said storage means and by said polarity comparator.

* * * * *